(12) United States Patent
Darcangelo et al.

(10) Patent No.: US 12,715,079 B2
(45) Date of Patent: Aug. 25, 2026

(54) COATED ARTICLES, METHODS OF POLISHING, AND METHODS OF MAKING THE SAME

(71) Applicant: CORNING INCORPORATED, Corning, NY (US)

(72) Inventors: Charles Michael Darcangelo, Corning, NY (US); Albert Joseph Fahey, Corning, NY (US); Jiangwei Feng, Newtown, PA (US); Hamidreza Pirayesh, San Diego, CA (US); Ljerka Ukrainczyk, Ithaca, NY (US); Christine Coulter Wolcott, Horseheads, NY (US); Ruchirej Yongsunthon, Painted Post, NY (US); Binwei Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 189 days.

(21) Appl. No.: 18/747,710

(22) Filed: Jun. 19, 2024

(65) Prior Publication Data

US 2024/0424630 A1 Dec. 26, 2024

Related U.S. Application Data

(60) Provisional application No. 63/522,208, filed on Jun. 21, 2023.

(51) Int. Cl.

*B24B 1/00* (2006.01)
*C03C 17/32* (2006.01)
*C09G 1/02* (2006.01)

(52) U.S. Cl.

CPC ................ *B24B 1/00* (2013.01); *C03C 17/32* (2013.01); *C09G 1/02* (2013.01); *C03C 2217/76* (2013.01); *C03C 2218/31* (2013.01)

(58) Field of Classification Search

CPC ........... H10P 90/12995; H10P 90/6052; H10P 95/402; H10P 72/0411; H10P 72/0414;
(Continued)

(56) References Cited

U.S. PATENT DOCUMENTS 5,328,768 A 7/1994 Goodwin
6,355,113 B1 3/2002 Nalewajek et al.
(Continued)

FOREIGN PATENT DOCUMENTS

CN 1955131 A 5/2007
JP 2000-343390 A 12/2000
(Continued)

OTHER PUBLICATIONS

Hong et al; "Tribology in Chemical-Mechanical Planarization"; Taylor & Francis Group' 2005, 8 Pages.
(Continued)

*Primary Examiner* — Robert F Neibaur
(74) *Attorney, Agent, or Firm* — Russell S. Magaziner

(57) ABSTRACT

Methods of polishing and/or forming a coated article include polishing a first major surface of a substrate with a polishing liquid. Then, methods include washing the first major surface with a cleaning liquid. In aspects, the cleaning liquid has a pH from about 7 to about 11. In aspects, the polishing liquid is supplied at a rate of 20 mL/min or less. In aspects, methods can further include applying a hydrophobic coating to form a coating with an exterior surface of the coated article. A coated article includes a hydrophobic coating with an exterior surface disposed on a first major surface of a substrate. A water contact angle of the exterior surface is about 100° or more. The coated article can exhibit an abraded water contact angle of about 100° or more after being abraded with steel wool for 8000 cycles in the Taber Test.

3 Claims, 4 Drawing Sheets

(58) Field of Classification Search
CPC ..... B24B 37/042; B24B 37/044; B24B 37/10; B24B 37/056; B24B 1/04; B24B 7/228; B24B 7/241; B24B 57/02; C09G 1/02
USPC .................................... 451/41, 36, 287, 210
See application file for complete search history.

(56) References Cited

U.S. PATENT DOCUMENTS 7,662,192 B2 2/2010 Hanada et al.
9,809,488 B2 11/2017 Beall et al.
10,160,688 B2 * 12/2018 Amin .................... C03C 17/225
11,274,230 B1 3/2022 Guo
2001/0055937 A1 * 12/2001 Wada .................... B24B 37/345 451/36
2007/0093375 A1 4/2007 Nakajima
2008/0139089 A1 * 6/2008 Aoki ..................... H10P 90/129 451/37
2008/0142054 A1 * 6/2008 Eitoku ................ H10P 72/0424 134/30
2009/0321390 A1 * 12/2009 Li ........................... C09G 1/02 252/79.1
2015/0290765 A1 * 10/2015 Otsuka .................. B24B 37/044 451/56
2016/0122591 A1 * 5/2016 Tsuchiya .................. C09G 1/02 252/79.1
2017/0247574 A1 8/2017 Takahashi et al.
2018/0030285 A1 * 2/2018 Olson ..................... C03C 17/32
2018/0127308 A1 * 5/2018 Leivo ...................... C08L 83/08
2018/0186686 A1 7/2018 Beall et al.
2020/0399173 A1 12/2020 Amin et al.
2022/0064490 A1 * 3/2022 Kamimura ............... C09G 1/02
2023/0135325 A1 5/2023 Liang et al.
2023/0143074 A1 5/2023 Tsuchiya

FOREIGN PATENT DOCUMENTS

JP 4933863 B2 5/2012
WO 2014/175292 A1 10/2014
WO WO-2017218475 A1 * 12/2017 ........... C03C 21/002
WO 2022/005959 A1 1/2022

OTHER PUBLICATIONS

Li , "Microelectronic Applications of Chemical Meachnical Planarization"; Wiley Interscience 2007, 28 Pages.
Suratwala et al; "Chemistry & Formation of the Bielby Layer During Polishing of Fused Silica Glass"; Journal of American Ceramic Society, 98 (2015); pp. 2395-2402.
Zhu et al; "Wetting Characteristics of Spodumene Surfaces as Insluenced by Collector Adsorption"; Materials Engineering, 130 (2019), pp. 117-128.
International Search Report and Written Opinion of the International Searching Authority; PCT/US2024/031605; dated Sep. 18, 2024; 12 pages; European Patent Office.

* cited by examiner

COATED ARTICLES, METHODS OF POLISHING, AND METHODS OF MAKING THE SAME

CROSS-REFERENCE TO RELATED APPLICATION

This application claims the benefit of priority under 35 U.S.C. § 119 of U.S. Provisional Application Ser. No. 63/522,208 filed on Jun. 21, 2023, the content of which is relied upon and incorporated herein by reference in its entirety.

FIELD

The present disclosure relates generally to coated articles, methods of polishing, and methods of making coated articles and, more particularly, to coated articles including a hydrophobic coating, methods of polishing using a polishing liquid and/or a cleaning liquid, and methods of making the same.

BACKGROUND

Foldable substrates are commonly used, for example, in display applications, for example, liquid crystal displays (LCDs), electrophoretic displays (EPD), organic light-emitting diode displays (OLEDs), plasma display panels (PDPs), or the like.

It is known to provide a coating on substrates, for example, foldable displays and/or foldable protective covers. For example, such organic materials can provide anti-bacterial, easy-to-clean, and/or hydrophilic functionality. However, organic coatings can have durability issues, for example, being susceptible to abrasion and/or loss of functionality. Consequently, there is a desire to develop displays as well as protective covers exhibiting good abrasion resistance.

SUMMARY

There are set forth herein coated articles with good adhesion and good abrasion resistance (e.g., an abraded water contact angle of about 100° or more after 2,000 cycles or more, after 4,000 cycles or more, about 6,000 cycles or more, or about 8,000 cycles or more in a Steel Wool Abrasion Test), for example, maintaining a hydrophobic and/or oleophilic character. Also, providing the coating on a substrate increases a durability of the coated article, for example, by filling and/or protecting surface flaws in the substrate from damage. Additionally, the substrate may comprise a glass-based substrate and/or a ceramic-based substrate such as a glass-ceramic to enhance a puncture resistance and/or an impact resistance. Further, the glass-based substrate and/or ceramic-based substrate may be chemically strengthened to further enhance the impact resistance and/or the puncture resistance of the coated article while simultaneously facilitating good bending performance. Providing a surface roughness Ra and/or surface roughness Rq of about 1.6 nm or less or about 1.5 nm or less can enable good adhesion between the substrate and the coating and/or a good abrasion resistance of the coating. Especially when the substrate is a glass-ceramic substrate, methods of the present disclosure can achieve the above-mentioned surface roughness Ra and/or surface roughness Rq while other methods may not.

Methods of polishing, washing, and making coated articles set forth herein can achieve coated articles with good adhesion and good abrasion resistance (e.g., between a coating and a substrate). Especially for glass-ceramics, etching during the polishing can increase a surface roughness of the first major surface and/or introduce irregularities that can be the origin of cracks and/or mechanical failure. Consequently, methods provided herein increase a fraction of material removed by friction (e.g., abrasion, as opposed to etching) while reducing a fraction of material removed by etching (e.g., chemical dissolution of a material of the substrate). Providing a loose abrasive comprising silica, zirconia, and/or alumina may be less chemically reactive than other materials (e.g., ceria), which can reduce a portion of the material being removed by etching as opposed to abrasion during the polishing. Providing a slightly alkaline solution (e.g., pH from 7 to 11 or from 9 to 10.5) can reduce an amount of a material removed by etching as opposed to abrasion during the polishing. Providing a relatively low rate of polishing liquid (e.g., about 20 millLiters per minute (mL/min) or less, from about 1 ml/min to about 10 mL/min, or from about 2 mL/min to about 5 mL/min) can increase a fraction of material removed by friction. Providing a rotation rate of a pad during the polishing of about 95 rpm or more (e.g., from about 100 rpm to about 145 rpm) can increase an amount of material removed by abrasion (e.g., by increasing a volume swept out by the loose abrasive per period of time) during the polishing while maintaining thermal and quality control during the polishing. Providing a pressure of about 25 kPa or 27.5 kPa or more can increase an amount of material removed by abrasion (e.g., by increasing a frictional force between the loose abrasive and the first major surface) during the polishing while maintaining thermal and quality control during the polishing.

Providing a slightly alkaline solution (e.g., pH from 7 to 11 or from 9 to 10.5) can reduce an amount of a material removed by etching during the washing. As demonstrated by the Examples herein, providing a cleaning liquid (for the washing) with a slightly alkaline pH (e.g., pH from 7 to 11 or from 9 to 10.5) can significantly increase an abrasion resistance of the resulting coated article. For ceramic-based substrates and/or glass-ceramics, etching during the washing can increase a surface roughness of the first major surface and/or introduce irregularities that can be the origin of cracks and/or mechanical failure. Providing a fluorinated solvent can facilitate removal of waxes and/or other hydrocarbons that may have been transferred to the first major surface during the polishing and/or previous processing. Additionally, any fluorine-containing residue remaining after the washing can reduce an amount of moisture that is transferred to and/or absorbed by the first major surface between the washing and subsequent coatings (e.g., with a hydrophobic coating), where the moisture could otherwise impair an adhesion of the subsequent coating to the substrate. Additionally, methods exist to recycle fluorinated solvents, which can reduce cost and environmental impact of the washing.

Some example aspects of the disclosure are described below with the understanding that any of the features of the various aspects may be used alone or in combination with one another.

Aspect 1. A method of polishing a first major surface of a substrate comprising:

polishing the first major surface with a polishing liquid; and then washing the first major surface with a cleaning liquid, wherein the cleaning liquid comprises a pH in a range from about 7 to about 11.

Aspect 2. The method of aspect 1, wherein the pH of the cleaning liquid is in a range from about 9 to about 10.

Aspect 3. The method of any one of aspects 1-2, wherein the cleaning liquid comprises a fluorinated solvent.

Aspect 4. The method of any one of aspects 1-3, wherein the washing comprises ultrasonication of the cleaning liquid.

Aspect 5. The method of any one of aspects 1-4, wherein the cleaning liquid comprises a temperature in a range from about 40° C. to about 100° C.

Aspect 6. The method of any one of aspects 1-5, wherein the washing occurs for about 5 minutes or more.

Aspect 7. The method of any one of aspects 1-6, wherein the polishing liquid comprises a loose abrasive, and the polishing liquid is supplied at a rate of 20 milliliters per minute or less.

Aspect 8. A method of polishing a first major surface of a substrate comprising:

polishing the first major surface with a polishing liquid comprising a loose abrasive; and then washing the first major surface with a cleaning liquid, wherein the polishing liquid is supplied at a rate of 20 milliliters per minute or less.

Aspect 9. The method of any one of aspects 7-8, wherein the rate that the polishing liquid is supplied is in a range from about 1 milliliter per minute to about 10 milliliters per minute.

Aspect 10. The method of aspect 9, wherein the rate that the polishing liquid is supplied is in a range from about 2 milliliters per minute to about 5 milliliters per minute.

Aspect 11. The method of any one of aspects 7-10, wherein the loose abrasive comprises silica, zirconia, alumina, or combinations thereof.

Aspect 12. The method of any one of aspects 7-11, wherein the polishing comprises applying a pressure to the polishing liquid on the first major surface, the pressure is about 27.5 kiloPascals (4 pounds per square inch) or more.

Aspect 13. The method of any one of aspects 7-12, wherein the polishing comprises rotating a pad, the polishing liquid positioned between the pad and the first major surface, and the pad is rotated at a speed of about 95 revolutions per minute or more.

Aspect 14. The method of aspect 13, wherein the speed is in a range from about 100 revolutions per minute to about 145 revolutions per minute.

Aspect 15. The method of any one of aspects 7-14, wherein the loose abrasive comprises a median particle size in a range from about 10 nanometers to about 500 nanometers.

Aspect 16. The method of aspect 15, wherein the median particle size is in a range from about 20 nanometers to about 100 nanometers.

Aspect 17. The method of any one of aspects 7-14, wherein a pH of the polishing liquid is in a range from about 7 to about 11.

Aspect 18. The method of any one of aspects 7-17, wherein an amount of the loose abrasive, as a wt % of the polishing liquid, is in a range from about 1 wt % to about 30 wt %.

Aspect 19. The method of any one of aspects 7-17, wherein an amount of the loose abrasive, as a wt % of the polishing liquid, is in a range from about 3 wt % to about 10 wt %.

Aspect 20. The method of any one of aspects 1-19, wherein a removal rate of material from the first major surface during the polishing, as a thickness of the substrate, is about 0.2 micrometers per minute or more.

Aspect 21. The method of any one of aspects 1-20, wherein the substrate comprises a glass-ceramic.

Aspect 22. The method of aspect 21, wherein the glass-ceramic comprises a crystalline phase comprising one or more of lithium disilicate, petalite, or combinations thereof.

Aspect 23. The method of any one of aspects 1-22, wherein, after the washing, the first major surface comprises a surface roughness Ra of about 2 nm or less.

Aspect 24. The method of aspect 23, wherein the surface roughness Ra is in a range from about 0.5 nm to about 1.6 nm.

Aspect 25. The method of any one of aspects 1-24, wherein, after the washing, wherein the first major surface comprises a surface roughness Rq of about 2 nm or less.

Aspect 26. The method of aspect 25, wherein the surface roughness Rq is in a range from about 0.5 to about 1.5 nm.

Aspect 27. The method of any one of aspects 1-26, wherein the substrate comprises a first compressive stress region extending to a first depth of compression from the first major surface, and a first maximum compressive stress of the first compressive stress region is about 300 MegaPascals or more.

Aspect 28. A method of forming a coated article from a substrate comprising a first major surface, the method comprising:

the method of any one of aspects 1-27; and then applying a hydrophobic coating to the first major surface to form an exterior surface the coated article, wherein the exterior surface exhibits an as-formed water contact angle of about 100° or more.

Aspect 29. The method of aspect 28, wherein the coated article exhibits an abraded water contact angle of about 100° or more after being abraded with steel wool for 8000 cycles in a Taber Test.

Aspect 30. The method of aspect 28, wherein the coated article exhibits a ring-on-ring strength of about 150 kgf or more.

Aspect 31. A coated article produced using the method of any one of aspects 1-28 comprising the hydrophobic coating disposed on the first major surface of the substrate, wherein an as-formed water contact angle of an exterior surface of the hydrophobic coating is about 100° or more, and the coated article exhibits an abraded water contact angle of about 100° or more after being abraded with steel wool for 8000 cycles in the Taber Test.

Aspect 32. A coated article comprising:

a hydrophobic coating disposed on a first major surface of a substrate, wherein an as-formed water contact angle of an exterior surface of the hydrophobic coating is about 100° or more, and the coated article exhibits an abraded water contact angle of about 100° or more after being abraded with steel wool for 8000 cycles in the Taber Test.

Aspect 33. The coated article of any one of aspects 31-32, wherein the coated article exhibits a ring-on-ring strength of about 150 kgf or more.

Aspect 34. The coated article of any one of aspects 31-33, wherein the first major surface comprises a surface roughness Ra of about 2 nm or less.

Aspect 35. The coated article of aspect 34, wherein the surface roughness Ra is in a range from about 0.5 nm to about 1.6 nm.

Aspect 36. The coated article of any one of aspects 31-35, wherein, after the washing, wherein the first major surface comprises a surface roughness Rq of about 2 nm or less.

Aspect 37. The coated article of aspect 36, wherein the surface roughness Rq is in a range from about 0.5 nm to about 1.5 nm.

Aspect 38. The coated article of any one of aspects 31-37, wherein the substrate comprises a glass-ceramic.

Aspect 39. The coated article of aspect 38, wherein the glass-ceramic comprises a crystalline phase comprising one or more of lithium disilicate, petalite, or combinations thereof.

Aspect 40. A consumer electronic product, comprising:

a housing comprising a front surface, a back surface, and side surfaces;

electrical components at least partially within the housing, the electrical components comprising a controller, a memory, and a display, the display at or adjacent the front surface of the housing; and a cover substrate disposed over the display, wherein at least one of a portion of the housing or the cover substrate comprises the coated article of any one of aspects 31-39.

Aspect 41. A consumer electronic product, comprising:

a housing comprising a front surface, a back surface, and side surfaces;

electrical components at least partially within the housing, the electrical components comprising a controller, a memory, and a display, the display at or adjacent the front surface of the housing; and a cover substrate disposed over the display, wherein at least one of a portion of the housing or the cover substrate is produced using the method of any one of aspects 1-30.

BRIEF DESCRIPTION OF THE DRAWINGS

The above and other features and advantages of aspects of the present disclosure are better understood when the following detailed description is read with reference to the accompanying drawings, in which.

Figure 1:
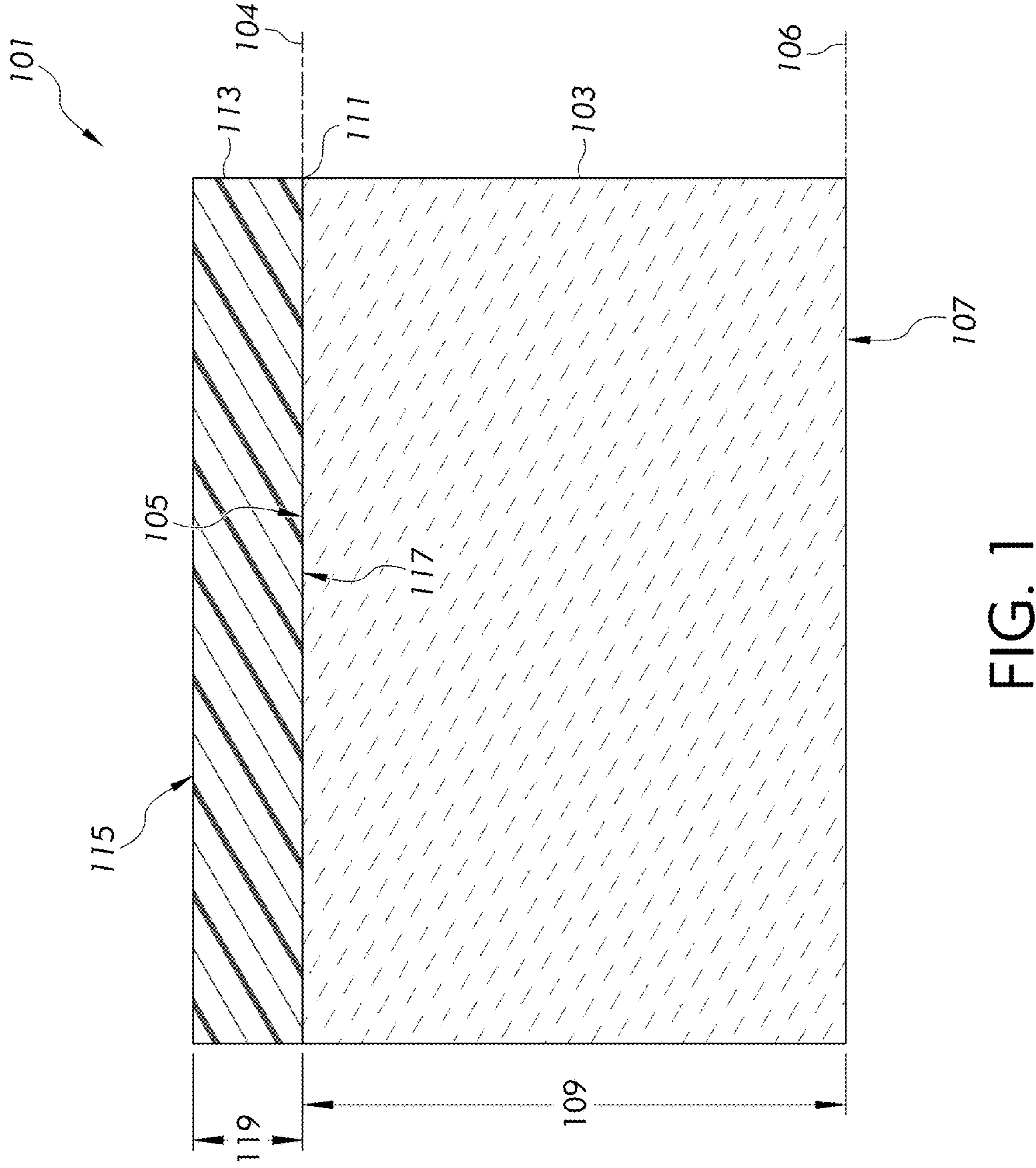
FIG. 1 is a schematic view of an example coated article according to aspects.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts.

FIG. 1 schematically illustrates an example coated article 101 including a first major surface 105 in accordance with aspects of the disclosure. Unless otherwise noted, a discussion of features of aspects of the first major surface, coated article can apply equally to corresponding features of any aspect of the disclosure. Likewise, unless otherwise noted, a discussion of features of aspects of methods, the polishing liquid, loose abrasive, and/or the cleaning liquid can apply equally to corresponding features of any aspect of the disclosure. For example, identical part numbers throughout the disclosure can indicate that, in some aspects, the identified features are identical to one another and that the discussion of the identified feature of one aspect, unless otherwise noted, can apply equally to the identified feature of any other aspect of the disclosure.

As shown in FIG. 1, the coated article 101 comprises a substrate 103 including the first major surface 105. In aspects, the substrate can have a pencil hardness of 8H or more, for example, 9H or more. As used herein, pencil hardness is measured using ASTM D 3363-20 with standard lead graded pencils. Throughout the disclosure, an elastic modulus (e.g., Young's modulus) of the substrate 103 (e.g., glass-based material, ceramic-based material) is measured using indentation methods in accordance with ASTM E2546-15. In aspects, the substrate 103 can comprise an elastic modulus of about 10 GigaPascal (GPa) or more, about 30 GPa or more, about 50 GPa or more, about 60 GPa or more, about 70 GPa or more, about 200 GPa or less, about 150 GPa or less, about 120 GPa or less, 100 GPa or less, about 90 GPa or less, or about 80 GPa or less. In aspects, the substrate 103 can comprise an elastic modulus in a range from about 10 GPa to about 200 GPa, from about 30 GPa to about 150 GPa, from about 50 GPa to about 120 GPa, from about 60 GPa to about 100 GPa, from about 60 GPa to about 90 GPa, from about 70 GPa to about 90 GPa, or any range or subrange therebetween. In aspects, the substrate 103 can comprise a glass-based material and/or a ceramic-based material. In aspects, the substrate 103 can comprise a glass-based substrate and/or a ceramic-based substrate. Providing the coating on a substrate increases a durability of the coated article, for example, by filling and/or protecting surface flaws in the substrate from damage. Additionally, the substrate may comprise a glass-based substrate and/or a ceramic-based substrate to enhance puncture resistance and/or impact resistance.

As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In aspects, glass-based material can comprise an alkali-containing glass or an alkali-free glass, either of which may be free of lithia or not. In aspects, the glass material can be alkali-free and/or comprise a low content of alkali metals (e.g., $R_2O$ of about 10 mol % or less, wherein $R_2O$ comprises $Li_2O$ $Na_2O$, $K_2O$, or the more expansive list provided below). In one or more aspects, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. "Glass-ceramics" include materials produced through controlled crystallization of glass. In aspects, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, $ZnO \times Al_2O_3 \times nSiO_2$ (i.e., ZAS system), and/or glass-ceramics that include a predominant crystal phase including β-quartz solid solution, β-spodumene, cordierite, petalite, and/or lithium disilicate. The glass-ceramic substrates may be strengthened using the chemical strengthening processes. In one or more aspects, MAS-System glass-ceramic substrates may be strengthened in $Li_2SO_4$ molten salt, whereby an exchange of $2Li^+$ for $Mg^{2+}$ can occur.

As used herein, "ceramic-based" includes both ceramics and glass-ceramics, wherein glass-ceramics have one or more crystalline phases and an amorphous, residual glass phase. Ceramic-based materials can be strengthened (e.g., chemically strengthened). In aspects, a ceramic-based material can be formed by heating a glass-based material to form ceramic (e.g., crystalline) portions. In further aspects, ceramic-based materials can comprise one or more nucleating agents that can facilitate the formation of crystalline phase(s). In aspects, ceramic-based materials can comprise one or more oxides, nitrides, oxynitrides, carbides, borides, and/or silicides. Example aspects of ceramic oxides include zirconia ($ZrO_2$), zircon ($ZrSiO_4$), an alkali-metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxides, beryllium oxides, vanadium oxide ($VO_2$), fused quartz, mullite (a mineral comprising a combination of aluminum oxide and silicon dioxide), and spinel ($MgAl_2O_4$). Example aspects of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example aspects of oxynitride ceramics include silicon oxynitride, aluminum oxynitride, and a silicon-aluminum oxynitride.

As shown in FIG. 1, the substrate 103 can comprise a second major surface 107 opposite the first major surface 105. As shown in FIG. 1, the first major surface 105 can extend along a first plane 104. As further shown in FIG. 1, the second major surface 107 can extend along a second plane 106. In aspects, as shown, the second plane 106 can be parallel to the first plane 104. As used herein, a substrate thickness 109 is defined between the first major surface 105 and the second major surface 107 as an average distance between the first major surface 105 and the second major surface 107. For example, as shown in FIG. 1, the substrate thickness 109 is an average distance between the first major surface 105 and the second major surface 107, which is equal to a distance between the first plane 104 and the second plane 106 since the first major surface 105 and the second major surface 107 are depicted as planar surfaces. In aspects, the substrate thickness 109 can be about 10 micrometers (μm) or more, about 25 μm or more, about 40 μm or more, about 60 μm or more, about 80 μm or more, about 100 μm or more, about 125 μm or more, about 150 μm or more, about 5 millimeters (mm) or less, about 3 mm or less, about 2 mm or less, about 1 mm or less, about 800 μm or less, about 500 μm or less, about 300 μm or less, about 200 μm or less, about 180 μm or less, or about 160 μm or less. In aspects, the substrate thickness 109 can be in a range from about 10 μm to about 5 mm, from about 10 μm to about 3 mm, from about 25 μm to about 2 mm, from about 40 μm to about 2 mm, from about 60 μm to about 2 mm, from about 80 μm to about 2 mm, from about 100 μm to about 2 mm, from about 100 μm to about 1 mm, from about 100 μm to about 800 μm, from about 100 μm to about 500 μm, from about 125 μm to about 500 μm, from about 125 μm to about 300 μm, from about 125 μm to about 200 μm, from about 150 μm to about 200 μm, from about 150 μm to about 160 μm, or any range or subrange therebetween. In aspects, the substrate thickness 109 can be in a range from about 80 μm to about 5 mm, from about 80 μm to about 2 mm, from about 80 μm to about 1 mm, from about 80 μm to about 500 μm, from about 80 μm to about 300 μm, from about 200 μm to about 2 mm, from about 200 μm to about 1 mm, from about 200 μm to about 500 μm, from about 500 μm to about 2 mm, from about 500 μm to about 1 mm, or any range or subrange therebetween. In aspects, the substrate thickness 109 can be about 300 μm or less, for example, from about 10 μm to about 300 μm, from 25 μm to about 300 μm, from about 25 μm to about 200 μm, from about 25 μm to about 180 μm, from about 40 μm to about 180 μm, from about 40 μm to about 160 μm, from about 60 μm to about 160 μm, from about 80 μm to about 160 μm, or any range or subrange therebetween.

Throughout the disclosure, a surface profile of the first surface area of the coating is measured over a test area of 2 μm by 2 μm as measured using atomic force microscopy (AFM), which is used to characterize the first surface area using the parameters defined in ISO 4287:1997. As used herein, surface roughness Ra is calculated as an arithmetical mean of the absolute deviation of a surface profile from an average position. As used herein, surface roughness Rq is calculated as a root mean square (RMS) of the deviation of a surface profile from an average position in a direction normal to the surface. As used herein, skewness Rsk is an average of the cube of the deviation of a surface profile from an average position divided by the cube of surface roughness Rq.

In aspects, a surface roughness Ra of the first major surface 105 can be about 2 nm or less, about 1.8 nm or less, about 1.6 nm or less, about 1.5 nm or less, about 1.4 nm or less, about 1.3 nm or less, about 1.2 nm or less, about 1.1 nm or less, about 1 nm or less, about 0.9 nm or less, about 0.8 nm or less, about 0.3 nm or more, about 0.4 nm or more, about 0.5 nm or more, about 0.6 nm or more, about 0.7 nm or more, about 0.8 nm or more, about 0.9 nm or more, about 1 nm or more, about 1.1 nm or more, or about 1.2 nm or more. In aspects, the surface roughness Ra of the first major surface 105 can be in a range from about 0.3 nm to about 2 nm, from about 0.4 nm to about 1.8 nm, from about 0.5 nm to about 1.6 nm, from about 0.6 nm to about 1.5 nm, from about 0.7 nm to about 1.4 nm, from about 0.8 nm to about 1.3 nm, from about 0.9 nm to about 1.2 nm, from about 1 nm to about 1.1 nm, or any range or subrange therebetween. In aspects, a surface roughness Rq of the first major surface 105 can be about 2 nm or less, about 1.8 nm or less, about 1.6 nm or less, about 1.5 nm or less, about 1.4 nm or less, about 1.3 nm or less, about 1.2 nm or less, about 1.1 nm or less, about 1 nm or less, about 0.9 nm or less, about 0.8 nm or less, about 0.3 nm or more, about 0.4 nm or more, about 0.5 nm or more, about 0.6 nm or more, about 0.7 nm or more, about 0.8 nm or more, about 0.9 nm or more, about 1 nm or more, about 1.1 nm or more, or about 1.2 nm or more. In aspects, the surface roughness Rq of the first major surface 105 can be in a range from about 0.3 nm to about 2 nm, from about 0.4 nm to about 1.8 nm, from about 0.5 nm to about 1.6 nm, from about 0.5 nm to about 1.5 nm, from about 0.6 nm to about 1.4 nm, from about 0.7 nm to about 1.3 nm, from about 0.8 nm to about 1.2 nm, from about 0.9 nm to about 1.1 nm, or any range or subrange therebetween. Providing a surface roughness Ra and/or surface roughness Rq of about 1.6 nm or less or about 1.5 nm or less can enable good adhesion between the substrate and the coating and/or a good abrasion resistance of the coating. Especially when the substrate is a glass-ceramic substrate, methods of the present disclosure can achieve the above-mentioned surface roughness Ra and/or surface roughness Rq while other methods may not.

Throughout the disclosure, the ring-on-ring (ROR) test is a surface strength measurement for testing flat glass specimens, and ASTM C1499-09 (2013), entitled "Standard Test Method for Monotonic Equibiaxial Flexural Strength of Advanced Ceramics at Ambient Temperature," serves as the basis for the AROR test methodology described herein. The contents of ASTM C1499-09 are incorporated herein by reference in their entirety. The sample is placed between two concentric rings of differing size to determine equibiaxial flexural strength (i.e., the maximum stress that a material is capable of sustaining when subjected to flexure between two concentric rings) with the sample supported by a support ring with diameter D2. A force F is applied by a load cell to the surface of the glass-based article by a loading ring having a diameter D1. Unless otherwise indicated, a ratio of D1/D2 is 0.5. The loading and the support ring were aligned concentrically to within 0.5% of support ring diameter D2. The load cell used for testing is accurate to within ±1% at any load within a selected range. Testing is carried out at a temperature of 23±2° C. and a relative humidity of 40±10%. For fixture design, the radius r of the protruding surface of the loading ring is in a range of $h/2 \le r \le 3h/2$, where h is the thickness of sample. Loading and support rings are made of hardened steel with hardness HRc>40. The intended failure mechanism for the ROR test is to observe fracture of the sample originating from a region of the surface of the sample within both loading rings. Failures that occur outside of this region—i.e., between the loading ring and support ring—are omitted from data analysis. Due to the thinness and high strength of the sample, however, large deflections that exceed ½ of the sample thickness h are sometimes observed. It is therefore not uncommon to observe a high percentage of failures originating from underneath the loading ring. Stress cannot be accurately calculated without knowledge of stress development both inside and under the ring (collected via strain gauge analysis) and the origin of failure in each specimen. ROR testing therefore focuses on peak load at failure as the measured response. As used herein, "ring-on-ring strength" refers to the strength measured using the ROR test. In aspects, a ring-on-ring strength of the coated article 101 and/or the substrate 103 can be about 150 kgf or more, about 180 kgf or more, or about 200 kgf or more.

In aspects, the substrate 103 may comprise a glass-based substrate and/or ceramic-based substrate where one or more portions of the substrate may comprise a compressive stress region. In aspects, the compressive stress region may be created by chemically strengthening the substrate. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the substrate can enable small (e.g., smaller than about 10 mm or less) bend radii because the compressive stress from the chemical strengthening can counteract the bend-induced tensile stress on the outermost surface of the substrate (e.g., first major surface 105, or second major surface 107). A compressive stress region may extend into a portion of the substrate for a depth called the depth of compression. As used herein, depth of compression means the depth at which the stress in the chemically strengthened substrates described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate is generated by exchanging potassium ions into the substrate, a surface stress meter, for example, the FSM-6000 (Orihara Industrial Co., Ltd. (Japan)), is used to measure a depth of compression. Unless specified otherwise, compressive stress (including surface CS) is measured by a surface stress meter (FSM) using commercially available instruments, for example, the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 75 μm, SCALP is used to measure the depth of compression and central tension (CT). Where the stress in the substrate is generated by exchanging both potassium and sodium ions into the glass, and the article being measured is thicker than about 75 μm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL)

means the depth that the ions have exchanged into the substrate (e.g., sodium, potassium). Through the disclosure, when the central tension cannot be measured directly by SCALP (as when the article being measured is thinner than about 75 μm) the maximum central tension can be approximated by a product of a maximum compressive stress and a depth of compression divided by the difference between the thickness of the substrate and twice the depth of compression, wherein the compressive stress and depth of compression are measured by FSM.

In aspects, the substrate 103 may be chemically strengthened to form a first compressive stress region extending to a first depth of compression from the first major surface 105. In aspects, the substrate 103 may be chemically strengthened to form a second compressive stress region extending to a second depth of compression from the second major surface 107. In even further aspects, the first depth of compression (e.g., from the first major surface 105) and/or second depth of compression (e.g., from the second major surface 107) as a percentage of the substrate thickness 109 can be about 1% or more, about 5% or more, about 10% or more, about 30% or less, about 25% or less, or about 20% or less. In even further aspects, the first depth of compression and/or the second depth of compression as a percentage of the substrate thickness 109 can be in a range from about 1% to about 30%, from about 1% to about 25%, from about 5% to about 25%, from about 5% to about 20%, from about 10% to about 20%, or any range or subrange therebetween. In aspects, the first depth of compression and/or the second depth of compression can be about 1 μm or more, about 10 μm or more, about 50 μm or more, about 200 μm or less, about 150 μm or less, or about 100 μm or less. In aspects, the first depth of compression and/or the second depth of compression can be in a range from about 1 μm to about 200 μm, from about 1 μm to about 150 μm, from about 10 μm to about 150 μm, from about 50 μm to about 150 μm, from about 50 μm to about 100 μm, or any range or subrange therebetween. In aspects, the first depth of compression can be greater than, less than, or substantially the same as the second depth of compression. By providing a glass-based substrate and/or a ceramic-based substrate comprising a first depth of compression and/or a second depth of compression in a range from about 1% to about 30% of the first thickness, good impact and/or puncture resistance can be enabled.

In aspects, the substrate 103 can comprise a first depth of layer of one or more alkali metal ions associated with the first compressive stress region and/or a second depth of layer of one or more alkali metal ions associated with the second compressive stress region. In aspects, the first depth of layer and/or second depth of layer as a percentage of the substrate thickness 109 can be about 1% or more, about 5% or more, about 10% or more, about 15% or more, about 20% or more, about 35% or less, about 30% or less, about 25% or less, or about 22% or less. In aspects, the first depth of layer and/or second depth of layer as a percentage of the substrate thickness 109 can be in a range from about 1% to about 35%, from about 5% to about 35%, from about 5% to about 30%, from about 10% to about 30%, from about 10% to about 25%, from about 15% to about 25%, from about 15% to about 22%, from about 20% to about 22%, or any range or subrange therebetween. In aspects, the first depth of layer and/or second depth of layer can be about 1 μm or more, about 10 μm or more, about 50 μm or more, about 200 μm or less, about 150 μm or less, or about 100 μm or less. In aspects, the first depth of layer and/or second depth of layer of layer can be in a range from about 1 μm to about 200 μm, from about 1 μm to about 150 μm, from about 10 μm to about 150 μm, from about 50 μm to about 150 μm, from about 50 μm to about 100 μm, or any range or subrange therebetween.

In aspects, the first compressive stress region can comprise a maximum first compressive stress. In aspects, the second compressive stress region can comprise a maximum second compressive stress. In further aspects, the maximum first compressive stress and/or the maximum second compressive stress can be about 100 MegaPascals (MPa) or more, about 300 MPa or more, about 500 MPa or more, about 700 MPa or more, about 1,500 MPa or less, about 1,200 MPa or less, about 1,000 MPa or less, or about 900 MPa or less. In further aspects, the maximum first compressive stress and/or the maximum second compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 700 MPa to about 1,000 MPa, from about 700 MPa to about 900 MPa, or any range or subrange therebetween. Providing a maximum first compressive stress and/or a maximum second compressive stress in a range from about 100 MPa to about 1,500 MPa can enable good impact and/or puncture resistance.

In aspects, the substrate 103 can comprise a central tension region positioned between the first compressive stress region and the second compressive stress region. In further aspects, the central tension region can comprise a maximum central tensile stress. In aspects, the maximum central tensile stress can be about 50 MPa or more, about 100 MPa or more, about 200 MPa or more, about 250 MPa or more, about 750 MPa or less, about 600 MPa or less, about 500 MPa or less, about 450 MPa or less, about 400 MPa or less, about 350 MPa or less, or about 300 MPa or less. In aspects, the maximum central tensile stress can be in a range from about 50 MPa to about 750 MPa, from about 50 MPa to about 600 MPa, from about 100 MPa to about 600 MPa, from about 100 MPa to about 500 MPa, from about 200 MPa to about 500 MPa, from about 200 MPa to about 450 MPa, from about 250 MPa to about 450 MPa, from about 250 MPa to about 350 MPa, from about 250 MPa to about 300 MPa, or any range or subrange therebetween.

In aspects, as shown in FIG. 1, the coated article 101 can comprise a coating 113. As shown, the coating 113 can comprise a third major surface 115 and a fourth major surface 117 opposite the third major surface 115. In further aspects, as shown, the third major surface 115 can be an exterior surface of the coated article 101 and/or configured to face a user. In further aspects, the fourth major surface 117 can be disposed over and/or contact the first major surface 105 of the substrate 103. In even further aspects, the fourth major surface 117 of the coating 113 can contact the first major surface 105 at an interface 111. In aspects, the coating 113 can comprise a fluorine-containing compound. For example, the coating can comprise a fluorinated silane coupling agent (e.g., fluoroethersilanes, a perfluoropolyether silane, or any alkyl fluorosilane with oxymethyl groups pendant on the silicon atom) or a pefluoroalkylether. Alternatively, in aspects, the coating 113 can be fluorine-free. For example, the coating can comprise a partial silica-like network, a diamond-like coating, and/or a polymer. A diamond-like coating comprises carbon and may be created by applying a high voltage potential in the presence of a hydrocarbon plasma. In aspects, the coating can comprise a protonatable group, for example, an amine, for example, an alkyl aminosilane with oxymethyl groups pendant on the silicon atom.

A coating thickness 119 can be defined between the third major surface 115 and the fourth major surface 117 as an average distance between the third major surface 115 and the fourth major surface 117. In further aspects, the coating thickness 119 can be about 0.01 μm or more, about 0.05 μm or more, about 0.1 μm or more, about 1 μm or more, about 3 μm or more, about 5 μm or more, about 10 μm or more, about 15 μm or more, about 20 μm or more, about 25 μm or more, about 40 μm or more, about 50 μm or more, about 60 μm or more, about 70 μm or more, about 80 μm or more, about 90 μm or more, about 200 μm or less, about 150 μm or less, about 100 μm or less, about 80 μm or less, or about 50 μm or less, about 30 μm or less, about 25 μm or less, about 20 μm or less, about 15 μm or less, about 10 μm or less, about 5 μm or less, or about 2 μm or less. In aspects, the coating thickness 119 can be in a range from about 0.01 μm to about 200 μm, from about 0.05 μm to about 150 μm, from about 0.1 μm to about 100 μm, from about 1 μm to about 80 μm, from about 3 μm to about 50 μm, from about 5 μm to about 30 μm, from about 10 μm to about 25 μm, or any range or subrange therebetween. In further aspects, the coating thickness 119 can be about 50 μm or less, for example, from about 0.01 μm to about 50 μm, from about 0.01 μm to about 30 μm, from about 0.05 μm to about 25 μm, from about 0.05 μm to about 20 μm, from about 0.1 μm to about 15 μm, from about 0.1 μm to about 10 μm, from about 1 μm to about 5 μm, or any range or subrange therebetween.

In aspects, the coating 113, the substrate 103, and/or the coated article 101 can comprise a haze. As used herein, haze refers to transmission haze that is measured in accordance with ASTM E430. Haze is measured using a haze meter supplied by BYK Gardner under the trademark HAZE-GUARD PLUS, using an aperture over the source port. The aperture has a diameter of 8 mm. A CIE D65 illuminant is used as the light source for illuminating the coating and/or coated article. Unless otherwise indicated, haze is measured at a direction normal to an angle of incidence of the light on a surface of the sample (e.g., third major surface 115 of the coating 113, and/or the first major surface 105 the substrate 103). Haze of a coating is measured with the coating mounted on a glass-based article comprising a thickness of 1.0 millimeters (mm). In further aspects, the haze of the coating 113 and/or the coated article 101 can be about 0.01% or more, about 0.1% or more, about 0.2% or more, about 0.5% or less, about 0.4% or less, or about 0.3% or less. In further aspects, the haze of the coating 113, the substrate 103, and/or the coated article 101 can be in a range from about 0.01% to about 0.5%, from about 0.01% to about 0.4%, from about 0.1% to about 0.4%, from about 0.1% to about 0.3%, from about 0.2% to about 0.3%, or any range or subrange therebetween. Providing a low haze substrate can enable good visibility through the substrate.

Throughout the disclosure, the coating 113 can comprise CIE (L*, a*, b*) color coordinates measured using a D65 illuminant at an observer angle of 10° using a colorimeter (e.g., tristimulus colorimeter) and/or spectrophotometer, for example, CR-400 Chroma Meter (Konica Minolta) or a TR 520 Spectrophotometer (Lazar Scientific). In aspects, the CIE b* value can be about 1 or less, about 0.5 or less, about 0.4 or less, about 0 or more, about 0.2 or more, or about 0.3 or more. In aspects, the CIE b* value can be in a range from about 0 to about 1, from about 0.1 to about 0.5, from about 0.2 to about 0.4, from about 0.3 to about 0.4, or any range or subrange therebetween.

As used herein, the refractive index is measured in accordance with ASTM E1967-19, where the first wavelength comprises 589 nm. In aspects, an index of refraction of the coating 113 may be about 1.4 or more, about 1.45 or more, about 1.49 or more, about 1.50 or more, about 1.53 or more, about 1.6 or less, about 1.55 or less, about 1.54 or less, or about 1.52 or less. In aspects, the index of refraction of the coating 113 can be in a range from about 1.4 to about 1.6, from about 1.45 to about 1.6, from about 1.45 to about 1.55, from about 1.49 to about 1.55, from about 1.50 to about 1.55, from about 1.53 to about 1.55, from about 1.49 to about 1.54, from about 1.49 to about 1.52, or any range or subrange therebetween.

The substrate 103 can comprise a second index of refraction. In aspects, an index of refraction of the substrate 103 may be about 1.4 or more, about 1.45 or more, about 1.49 or more, about 1.50 or more, about 1.53 or more, about 1.6 or less, about 1.55 or less, about 1.54 or less, or about 1.52 or less. In aspects, the index of refraction of the substrate 103 can be in a range from about 1.4 to about 1.6, from about 1.45 to about 1.6, from about 1.45 to about 1.55, from about 1.49 to about 1.55, from about 1.50 to about 1.55, from about 1.53 to about 1.55, from about 1.49 to about 1.54, from about 1.49 to about 1.52, or any range or subrange therebetween. Throughout the disclosure, a magnitude of a difference between two values or an absolute difference between two values is the absolute value of the difference between the two values. In aspects, an absolute difference between the first refractive index of the coating 113 and the second refractive index of the substrate 103 can be about 0.01 or less, about 0.008 about 0.005 or less, about 0.004 or less, about 0.001 or more, about 0.002 or more, or about 0.003. In aspects, an absolute difference between the first refractive index of the coating 113 and the second refractive index of the substrate 103 can be in a range from about 0.001 to about 0.01, from about 0.001 to about 0.008, from about 0.002 to about 0.008, from about 0.002 to about 0.005, from about 0.003 to about 0.005, from about 0.003 to about 0.004, or any range or subrange therebetween. In aspects, the first index of refraction can be greater than the second index of refraction.

The coating 113 and/or the coated article 101 can comprise a contact angle of deionized water on the third major surface 115 of the coating 113. Throughout the disclosure, the contact angle is measured in accordance with ASTM D7334-08 (2013) at 25° C. Unless otherwise indicated, "contact angle" refers to a contact angle with deionized water. As used herein, an "as-formed" coating refers to a coating that has not been subjected to an abrasive (e.g., see Steel Wool Abrasion Test below). Unless otherwise indicated, the contact angle is of an "as-formed" coating. If a contact angle cannot be reliably determined due to a high degree of droplet spread corresponding to a contact angle of 15° or less, then the coating is said to "wet" the droplet material. As used herein, a coating is hydrophobic if the contact angle with deionized water is greater than 100°. In aspects, the coating 113 is hydrophobic. In aspects, the contact angle can be about 90° or more, about 95° or more, 100° or more, about 102° or more, about 105° or more, about 107° or more, about 110° or more, about 120° or less, about 118° or less, about 115° or less, about 112° or less, about 110° or less, about 108° or less, or about 105° or less. In further aspects, the contact angle can be in a range from about 90° to about 120°, from about 95° to about 118°, from about 100° to about 115°, from about 102° to about 112°, from about 105° to about 110°, from about 107° to about 110°, or any range or subrange therebetween.

As used herein, a coating is "oleophilic" if it has a hexadecane contact angle of less than 60°. In aspects, the coating 113 can be oleophilic. In aspects, a hexadecane contact angle of the third major surface 115 of the coating 113 (e.g., as-formed) can be 50° or less, about 45° or less, about 40° or less, about 30° or less, about 25° or less, about 20° or less, or the coating 113 can wet hexadecane. In further aspects, the coating 113 (e.g., as formed) wets hexadecane.

Throughout the disclosure, the dynamic coefficient of friction is measured in accordance with ASTM D1894-14. In aspects, the third major surface 115 of the coating 113 can comprise a dynamic coefficient of friction of about 0.1 or more, about 0.3 or more, about 0.4 or more, about 0.8 or less, about 0.6 or less, or about 0.5 or less. In aspects, the third major surface 115 of the coating 113 can comprise a dynamic coefficient of friction in a range from about 0.1 to about 0.8, from about 0.3 to about 0.8, from about 0.3 to about 0.6, from about 0.3 to about 0.5, from about 0.4 to about 0.5, or any range or subrange therebetween.

Throughout the disclosure, the "Steel Wool Abrasion Test" is used to determine the durability of a coating. For the Steel Wool Abrasion Test, steel wool (Bonstar #0000) was cut into strips (25 mm×12 mm) and placed on a sheet of aluminum foil to bake in an oven for 2 hours at 100° C. A steel wool strip was fitted to an attachment (10 mm×10 mm) of an abrader (5750, Taber Industries) using a zip tie. Weights totaling 720 grams were added to the Taber arm to result in a total applied load of 1 kilogram. The stroke length was set at 38 mm (1.5 inches), the speed was set to 60 cycles per minute, and testing occurred at 23° C. The area to be abraded was marked onto the back of the sample for tracking. A sample of the coating was secured in the abraded and subjected to up to 8,800 cycles (e.g., 400 cycles, 800 cycles, 1,600 cycles, 2,800 cycles, 3,800 cycles, 4,800 cycles, 5,800 cycles, 6,800 cycles, 7,800 cycles, and 8,800 cycles). After the coating is abraded for the predetermined number of cycles, an abraded water contact angle is measured in accordance with the method for the contact angle described above. A high contact angle (e.g., about 90° or more, about 95° or more, about 100° or more) is indicative of the coating surviving the Steel Wool Abrasion Test. Decreases in the contact angle below 70° correlate with a loss of the coating. In aspects, the abraded water contact angle after 400 cycles, 800 cycles, 1,600 cycles, 2,800 cycles, 3,800 cycles, 4,800 cycles, 5,800 cycles, 6,800 cycles, 7,800 cycles, and/or 8,800 cycles in the Steel Wool Abrasion Test can be about 90° or more, about 95° or more, about 98°, or about 100° or more, about 102° or more, or about 105°. For example, the abraded water contact angle after 8,000 cycles or more can be about 100° or more. In further aspects, after 10,000 cycles in the moderate abrasion test, the coated article can comprise a CIE a* value and/or a CIE b* value within one or more of the ranges discussed above. Providing the first major surface of the substrate with the surface roughness Ra and/or surface roughness Rq, in accordance with the aspects of the disclosure, can exhibit good abrasion resistance (e.g., an abraded water contact angle of about 100° or more after 2,000 cycles or more, after 4,000 cycles or more, about 6,000 cycles or more, or about 8,000 cycles or more in a Steel Wool Abrasion Test), for example, maintaining a hydrophobic and/or oleophilic character.

In aspects, the coating 113 can comprise an adhesion to the substrate 103. Throughout the disclosure, adhesion of the coating to the substrate can be measured using a cross-hatch adhesion test in accordance with ASTM D3359-09 Method B using the Crosshatch Paint Adhesion Test kit available from Gardco. In aspects, the coating 113 (e.g., of the coated article 101) can comprise an adhesion of 1B or more, 2B or more, 3B or more, 4B or more, 5B or more, 6B or more, from 1B to 6B, from 1B to 5B, from 1B to 4B, from 1B to 3B, from 1B to 2B, from 3B to 6B, from 3B to 5B, or from 3B to 4B. In aspects, the coating 113 can comprise an adhesion to the substrate of any of the values and/or ranges disclosed when tested as-formed. In aspects, the coating 113 can comprise an adhesion to the substrate of any of the values and/or ranges disclosed above after 10 days in a 50% relative humidity, 25° C. environment. In aspects, the coating 113 can comprise an adhesion to the substrate of any of the values and/or ranges disclosed above after 10 days in a 95% relative humidity, 25° C. environment. In aspects, the coating 113 can comprise an adhesion to the substrate of any of the values and/or ranges disclosed above after 10 days in a 95% relative humidity, 65° C. environment.

In aspects, the coated article 101 can withstand 10 days in a 50% relative humidity at 25° C. environment without visible delamination or visible cracking. As used herein, "visible delamination" refers to a separation (e.g., bubbling, lifting, curling) of the coating from the substrate that is visible with the naked eye. As used herein, "visible cracking" refers to a crack (e.g., breakage, crazing, separation into multiple pieces) of the coating that is visible with the naked eye. In aspects, the coated article 101 can withstand 10 days in a 95% relative humidity at 25° C. environment without visible delamination or visible cracking, the coated article 101 can withstand 10 days in a 95% relative humidity at 65° C. environment without visible delamination or visible cracking, the coated article 101 can withstand 10 days in a 50% relative humidity at 65° C. environment without visible delamination or visible cracking.

The coated article may have an impact resistance defined by the capability of coating 113 and/or the coated article 101 to avoid failure at a pen drop height (e.g., 5 centimeters (cm) or more, 8 cm or more, 10 cm or more, 12 cm or more, 15 cm or more), when measured according to the "Pen Drop Test." As used herein, the "Pen Drop Test" is conducted such that samples of the coated article are tested with the load (i.e., from a pen dropped from a certain height) imparted to an outer surface (e.g., third major surface 115 of coating 113 in FIG. 1) of the coating and/or coated article configured as in the parallel plate test. During testing, the laminate comprising the coating 113 and/or the coated article 101 is placed on an aluminum plate (6063 aluminum alloy, as polished to a surface roughness with 400 grit paper). No tape is used on the side of the sample resting on the aluminum plate.

In the Pen Drop test, the pen employed is a BIC Easy Glide Pen, Fine comprising a tungsten carbide ballpoint tip of 0.7 mm (0.68 mm) diameter, and a weight of 5.73 grams (g) including the cap (4.68 g without the cap). The ballpoint pen is held at a predetermined height from an outer surface (e.g., third major surface 115 of coating 113 in FIG. 1) of the laminate comprising the coating and/or the coated. A tube is used for the Pen Drop Test to guide the ballpoint pen to the outer surface of the coated article, and the tube is placed in contact with the outer surface of the coated article so that the longitudinal axis of the tube is substantially perpendicular to the outer surface of the coated article. The tube has an outside diameter of 1 inch (2.54 cm), an inside diameter of nine-sixteenths of an inch (1.4 cm), and a length of 90 cm. An acrylonitrile butadiene ("ABS") shim is employed to hold the ballpoint pen at a predetermined height for each test. After each drop, the tube is relocated relative to the outer surface of the sample to be tested to guide the ballpoint pen to a different impact location on the outer surface of the sample to be tested. It is to be understood that the Pen Drop Test can be used for any of the coatings and/or coated articles of aspects of the disclosure.

For the Pen Drop Test, the ballpoint pen is dropped with the cap attached to the top end (i.e., the end opposite the tip) so that the ballpoint tip can interact with the outer surface (e.g., third major surface 115 of coating 113 in FIG. 1) of the coating. In a drop sequence according to the Pen Drop Test, one pen drop is conducted at an initial height of 1 cm, followed by successive drops in 0.5 cm increments up to 20 cm, and then after 20 cm, 2 cm increments until failure of the sample to be tested. After each drop is conducted, the presence of any observable fracture, failure, or other evidence of damage to the coated article is recorded along with the particular predetermined height for the pen drop. Using the Pen Drop Test, multiple samples can be tested according to the same drop sequence to generate a population with improved statistical accuracy. For the Pen Drop Test, the ballpoint pen is to be changed to a new pen after every 5 drops, and for each new coated article tested. In addition, all pen drops are conducted at random locations on the coated article at or near the center of the coated article unless indicated otherwise, with no pen drops near or on the edge of the coated article.

For purposes of the Pen Drop Test, "failure" means the formation of a visible mechanical defect in a sample. The mechanical defect may be a crack or plastic deformation (e.g., surface indentation). The crack may be a surface crack or a through crack. The crack may be formed on an interior or exterior surface of a sample. The crack may extend through all or a portion of the coating 113 and/or the coated article 101. A visible mechanical defect has a minimum dimension of 0.2 millimeters or more. In aspects, the coating 113 and/or the coated article 101 can withstand a pen drop height of 1 cm or more, 3 cm or more, 5 cm or more, 7 cm or more, 8 cm or more, 9 cm or more, 10 cm or more, 11 cm or more, 12 cm or more, 13 cm or more, 14 cm or more, 15 cm or more, 16 cm or more, 17 cm or more, 18 cm or more, 19 cm or more, and/or 20 cm or more over the third major surface 115 of the coating 113.

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent the front surface of the housing. The consumer electronic product can comprise a cover substrate disposed over the display. In aspects, at least one of a portion of the housing or the cover substrate comprises the coating and/or coated article discussed throughout the disclosure. The display can comprise a liquid crystal display (LCD), an electrophoretic displays (EPD), an organic light-emitting diode (OLED) display, or a plasma display panel (PDP). In aspects, the consumer electronic product can be a portable electronic device, for example, a smartphone, a tablet, a wearable device, or a laptop.

Figure 2:
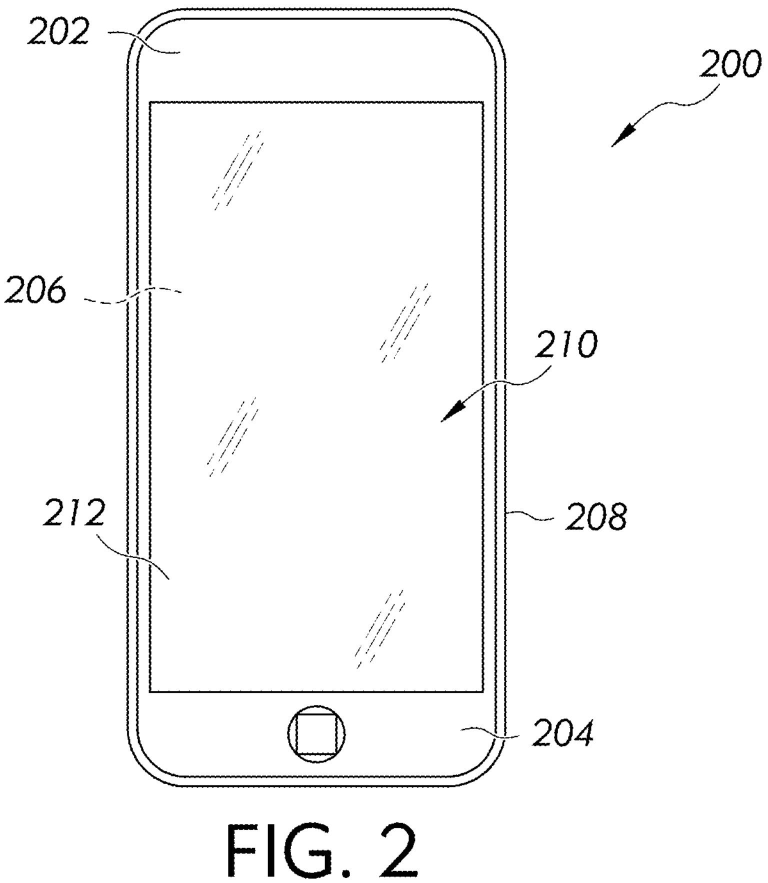
FIG. 2 is a schematic plan view of an example consumer electronic device according to aspects.
Figure 3:
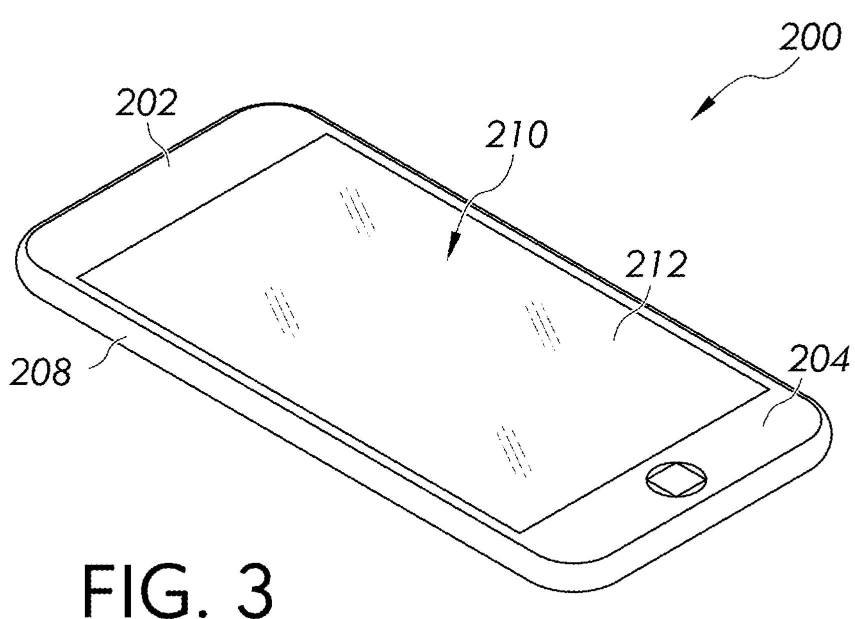
FIG. 3 is a schematic perspective view of the example consumer electronic device of FIG. 2.

The coated article and/or coating disclosed herein may be incorporated into another article, for example, an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion-resistance or a combination thereof. An exemplary article incorporating any of the coated articles disclosed herein is shown in FIGS. 2 and 3. Specifically, FIGS. 2 and 3 show a consumer electronic device 200 including a housing 202 having a front surface 204, a back surface 206, and side surfaces 208. The consumer electronic device 200 can comprise electrical components (not shown) that are at least partially inside or entirely within the housing and including at least a controller, a memory, and a display 210 at or adjacent to the front surface of the housing. The consumer electronic device 200 can comprise a cover substrate 212 at or over the front surface of the housing such that it is over the display. In aspects, at least one of the cover substrate 212 or a portion of housing 202 may include a substrate with the first major surface and/or the coated article disclosed herein.

Figure 4:
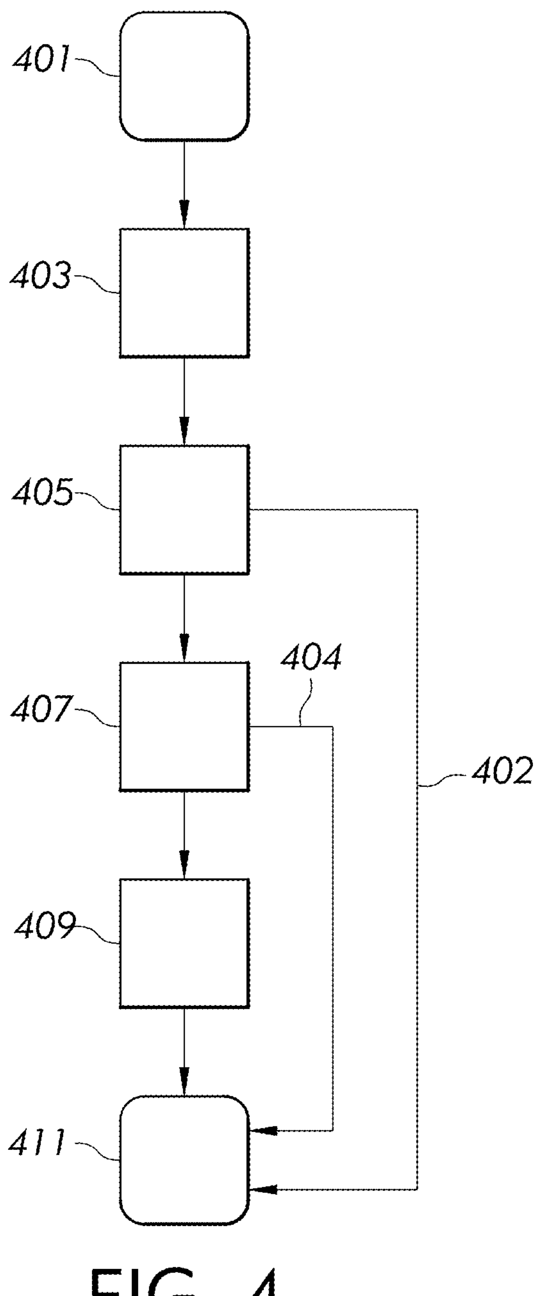
FIG. 4 is a flow chart illustrating example methods of polishing and/or methods of making coated articles in accordance with the aspects of the disclosure.

Aspects of methods of making the coated article 101 in accordance with aspects of the disclosure will be discussed with reference to the flow chart in FIG. 4 and example method steps illustrated in FIGS. 5-7. With reference to the flow chart of FIG. 4, methods can start at step 401. In aspects, step 401 can comprise providing a substrate. In further aspects, the substrate can resemble the substrate 103 of FIG. 1 comprising the substrate thickness 109. In further aspects, the substrate 103 can be provided by purchase or otherwise obtaining a substrate or by forming the substrate. In further aspects, the substrate can comprise a glass-based substrate and/or a ceramic-based substrate. In further aspects, glass-based substrates can be provided by forming them with a variety of ribbon forming processes, for example, slot draw, down-draw, fusion down-draw, up-draw, press roll, redraw, or float. In further aspects, ceramic-based substrates can be provided by heating a glass-based substrate to nucleate and/or grow crystals. Methods of the present disclosure are especially useful for glass-ceramics and/or ceramic-based substrates, where the crystalline phase can chemically react with the polishing liquid and/or treatment liquid differently than the amorphous phase. In even further aspects, the substrate can be chemically strengthened and comprise a depth of compression (e.g., first depth of compression, second depth of compression), compressive stress (e.g., first maximum compressive stress, second maximum compressive stress), and/or depth of layer (e.g., first depth of layer, second depth of layer) within one or more of the corresponding ranges discussed above.

Figure 5:
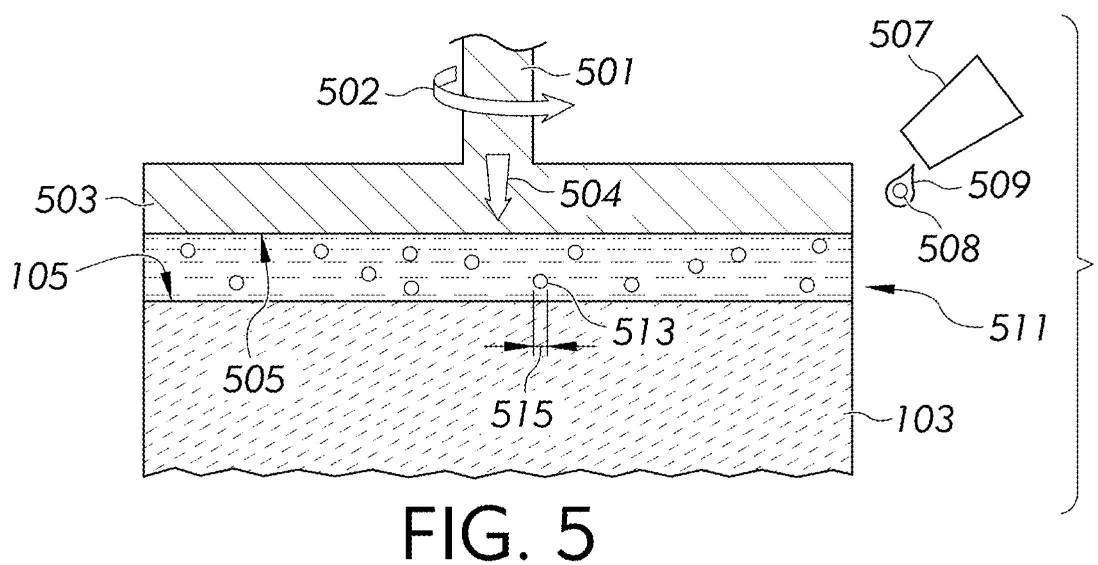
FIG. 5 schematically illustrates an example polishing step in methods in accordance with aspects of the disclosure.

After step 401, as shown in FIG. 5, methods can proceed to step 403 of polishing a first major surface 105 of the substrate 103 with a polishing liquid 511. In aspects, as shown, the polishing liquid 511 can comprise a loose abrasive 513. In further aspects, the loose abrasive can comprise one or more of silica, zirconia, alumina, or combinations thereof. Without wishing to be bound by theory, silica, zirconia, and/or alumina may be less chemically reactive than other materials (e.g., ceria), which can reduce a portion of the material being removed by etching as opposed to abrasion during the polishing.

In aspects, as shown in FIG. 5, the loose abrasive 513 can comprise a particle size 515 corresponding to a maximum dimension of the loose abrasive 513. In further aspects, a median particle size of the loose abrasive 513 can be about 10 nm or more, about 15 nm or more, about 20 nm or more, about 25 nm or more, about 30 nm or more, about 2 μm or less, about 1.5 μm or less, about 1 μm or less, about 500 nm or less, about 200 nm or less, about 100 nm or less, about 80 nm or less, about 50 nm or less, or about 40 nm or less. In further aspects, a median particle size of the loose abrasive 513 can be in a range from about 10 nm to about 2 μm, from about 10 nm to about 1.5 μm, from about 10 nm to about 1 μm, from about 10 nm to about 500 nm, from about 15 nm to about 200 nm, from about 20 nm to about 100 nm, from about 25 nm to about 80 nm, from about 25 nm to about 50 nm, from about 30 nm to about 40 nm, or any range or subrange therebetween. In aspects, an amount of the loose abrasive 513 in the polishing liquid 511, as a wt % of the polishing liquid 511, can be about 1 wt % or more, about 1.5 wt % or more, about 2 wt % or more, about 2.5 wt % or more, about 3 wt % or more, about 4 wt % or more, about 5 wt % or more, about 30 wt % or less, about 25 wt % or less, about 20 wt % or less, about 15 wt % or less, about 10 wt % or less, about 8 wt % or less, or about 6 wt % or less. In aspects, an amount of the loose abrasive 513 in the polishing liquid 511, as a wt % of the polishing liquid 511, can be in a range from about 1 wt % to about 30 wt %, from about 1 wt % to about 25 wt %, from about 1.5 wt % to about 20 wt %, from about 2 wt % to about 15 wt %, from about 2.5 wt % to about 10 wt %, from about 3 wt % to about 10 wt %, from about 4 wt % to about 8 wt %, or any range or subrange therebetween.

In aspects, as shown in FIG. 5, the polishing can comprise supplying additional polishing liquid 509 including additional loose abrasive 508 to supplement and/or maintain the polishing liquid 511 (e.g., between a pad 503 and the first major surface 105). In further aspects, as shown, the additional polishing liquid 509 can be dispensed from a container 507 (e.g., conduit, flexible tube, micropipette, or syringe) at a predetermined rate. In further aspects, the additional polishing liquid 509 can be identical to the polishing liquid 511, and/or the additional loose abrasive 508 can be identical to the loose abrasive 513. In further aspects, a rate that the additional polishing liquid 509 is supplied during the polishing can be about 20 milliliters per minute (mL/min) or less, about 15 mL/min or less, about 10 mL/min or less, about 7 mL/min or less, about 5 mL/min or less, about 4 mL/min or less, about 3 mL/min or less, about 0.5 mL/min or more, about 1 mL/min or more, about 1.5 mL/min or more, about 2 mL/min or more, about 2.5 mL/min or more, or about 3 mL/min or more. In aspects, the rate that the additional polishing liquid 509 is supplied during the polishing can be in a range from about 0.5 mL/min to about 20 mL/min, from about 1 mL/min to about 15 mL/min, from about 1.5 mL/min 10 mL/min, from about 2 mL/min to about 7 mL/min, from about 2 mL/min to about 5 mL/min, from about 2.5 mL/min to about 4 mL/min, or any range or subrange therebetween.

As used herein, a pH of a solution is measured in accordance with ASTM E70-90 at 25° C. with standard solutions extending to a pH of at least 14. In aspects, a pH of the polishing liquid 511 can be about 11 or less, about 10.5 or less, about 10 or less, about 9.5 or less, about 7 or more, about 8 or more, about 9 or more, or about 9.5 or more. In aspects, a pH of the polishing liquid 511 can be in a range from about 7 to about 11, from about 8 to about 10.5, from about 9 to about 10.5, from about 9 to about 10, or any range or subrange therebetween. Providing a slightly alkaline solution (e.g., pH from 7 to 11 or from 9 to 10.5) can reduce an amount of a material removed by etching as opposed to abrasion during the polishing.

In aspects, as shown in FIG. 5, the polishing can further comprise rotating a pad 503 by rotating (arrow 502) a shaft 501 attached thereto. Rotating the pad can result in removing material from (e.g., abrading) the first major surface, for example, by dragging the loose abrasive across the first major surface. In further aspects, a rate that the pad 503 is rotated (in revolutions per minute (rpm)) can be about 95 rpm or more, about 100 rpm or more, about 110 rpm or more, about 120 rpm or more, about 130 rpm or more, about 150 rpm or less, about 145 rpm or less, about 140 rpm or less, about 135 rpm or less, or about 130 rpm or less. In further aspects, a rate that the pad 503 is rotated can be in a range from about 95 rpm to about 150 rpm, from about 100 rpm to about 145 rpm, from about 110 rpm to about 130 rpm, from about 120 rpm to about 135 rpm, or any range or subrange therebetween. Providing a rotation rate of about 95 rpm or more (e.g., from about 100 rpm to about 145 rpm) can increase an amount of material removed by abrasion (e.g., by increasing a volume swept out by the loose abrasive per period of time) during the polishing while maintaining thermal and quality control during the polishing.

In aspects, as shown in FIG. 5, the polishing can further comprise applying a pressure 504 (e.g., force) from the pad 503 on the polishing liquid 511. In further aspects, the pressure can be about 25 kiloPascals (kPa or more), about 27.5 kPa or more, about 30 kPa or more, about 100 kPa or less, about 50 kPa or less, about 40 kPa or less, or about 35 kPa or less. In further aspects, the pressure can be in a range from about 25 kPa to about 100 kPa, from about 27.5 kPa to about 50 kPa, from about 30 kPa to about 40 kPa, or any range or subrange therebetween. Providing a pressure of about 25 kPa or 27.5 kPa or more can increase an amount of material removed by abrasion (e.g., by increasing a frictional force between the loose abrasive and the first major surface) during the polishing while maintaining thermal and quality control during the polishing. In aspects, a rate of remove of material from the first major surface 105 (measured as an average change in the thickness of the substrate 103) can about 0.2 μm/min or more.

Figure 6:
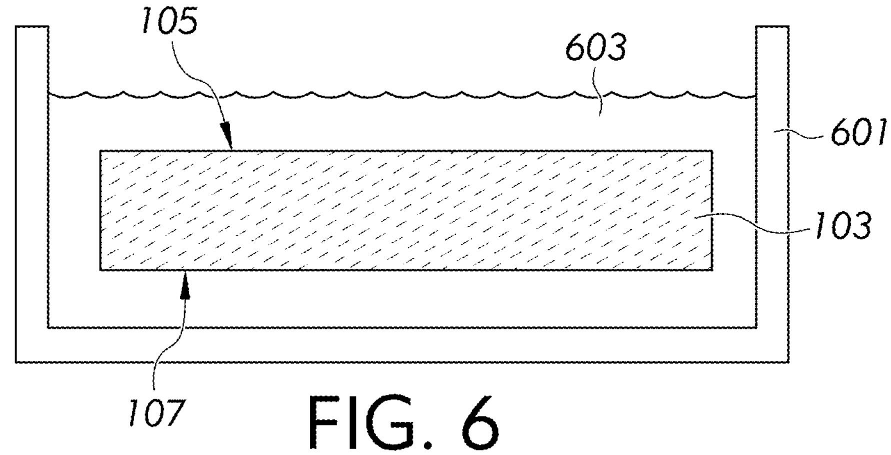
FIG. 6 schematically illustrates an example washing step in methods in accordance with aspects of the disclosure.

After step 403, as shown in FIG. 6, methods can proceed to step 405 comprising washing the first major surface 105 with a cleaning liquid 603. In aspects, as shown, the cleaning liquid 603 can be contained in a container 601, and the washing can comprise immersing at least the first major surface 105 of the substrate 103 in the cleaning liquid 603. In further aspects, the washing can comprise immersing the first major surface 105 and the second major surface 107 (e.g., the entire substrate 103) in the cleaning liquid 603. In addition to the cleaning liquid described herein for step 403, it is to be understood that washing and/or rising with additional solutions (e.g., water, acetone, an organic alcohol) can be performed before and/or after the washing with the cleaning liquid. Also, it is to be understood that the washing process described herein for step 403 can be repeated one or more times (e.g., alternating between the cleaning solution and one of the additional solutions mentioned in the previous sentence).

In aspects, a pH of the cleaning liquid 603 can be about 11 or less, about 10.5 or less, about 10 or less, about 9.5 or less, about 7 or more, about 8 or more, about 9 or more, or about 9.5 or more. In aspects, a pH of the cleaning liquid 603 can be in a range from about 7 to about 11, from about 8 to about 10.5, from about 9 to about 10.5, from about 9 to about 10, or any range or subrange therebetween. Providing a slightly alkaline solution (e.g., pH from 7 to 11 or from 9 to 10.5) can reduce an amount of a material removed by etching during the washing. For ceramic-based substrates and/or glass-ceramics, etching during the washing can increase a surface roughness of the first major surface and/or introduce irregularities that can be the origin of cracks and/or mechanical failure. In aspects, the cleaning liquid 603 can comprise a fluorinated solvent. In further aspects, fluorinated solvents can include fluorinated ethers and fluorocarbons. Providing a fluorinated solvent can facilitate removal of waxes and/or other hydrocarbons that may have been transferred to the first major surface during the polishing and/or previous processing. Additionally, any fluorine-containing residue remaining after the washing can reduce an amount of moisture that is transferred to and/or absorbed by the first major surface between the washing and subsequent coatings (e.g., with a hydrophobic coating), where the moisture could otherwise impair an adhesion of the subsequent coating to the substrate. Additionally, methods exist to recycle fluorinated solvents, which can reduce cost and environmental impact of the washing. Exemplary aspects of fluorinate solvents include Novec 7200 (available from 3M), AsahiKlin AE-3000 (Available from Asahi), Opteon SF10 (available from Chemours), Vertel XF (available from Dupont), and Fluorochem Solven HD (available from Fluorochem Corp.). Additionally and/or alternatively, exemplary aspects of components for the cleaning liquid include Luminox (pH 7) low-foaming neutral cleaner (available from Alconox), Valtron DP154 (pH 7) (available from Valtech), Valtron SP2275 (pH 7.3) (available from Valtech), Valtron DP97031 (pH 7.4) (available from Valtech), Liquinox (pH 8.5) critical cleaning liquid detergent (available from Alconox), Alconox (pH 9.5) precision cleaner (available from Alconox), Tergazyme (pH 9.5) enzyme-active detergent (available from Alconox), Detergent 8 (pH 11) low foaming ion-free detergent (available from Alconox). In aspects, the cleaning liquid 603 can leave less than 1 wt %, less than 0.5 wt %, less than 0.2 wt %, or less than 0.1 wt % non-volatile residue (i.e., residue that remains after heating at 120° C. for 1 hour).

In aspects, the washing can comprise maintaining the cleaning liquid 603 at a predetermined temperature and/or contacting the first major surface 105 with the cleaning liquid 603 for a predetermined period of time. In aspects, the predetermined temperature can be about 40° C. or more, about 50° C. or more, about 60° C. or more, about 70° C. or more, about 100° C. or less, about 90° C. or less, about 80° C. or less, or about 70° C. or less. In aspects, the predetermined temperature can be in a range from about 40° C. to about 100° C., from about 50° C. to about 90° C., from about 60° C. to about 80° C., or any range or subrange therebetween. In aspects, the predetermined period of time can be about 5 minutes or more, about 8 minutes or more, about 10 minutes or more, about 15 minutes or more, about 20 minutes or more, about 1 hour or less, about 45 minutes or less, about 30 minutes or less, about 20 minutes or less, or about 15 minutes or less. In aspects, the predetermined period of time can be in a range from about 5 minutes to about 1 hour, from about 8 minutes to about 45 minutes, from about 10 minutes to about 30 minutes, or any range or subrange therebetween. In aspects, the washing can comprise sonication, for example ultrasonication, of the cleaning liquid. Without wishing to be bound by theory, sonication (e.g., ultrasonication, megasonication) can help remove contaminants (e.g., particles, oils, residual abrasive) from a surface by forming microscale bubbles as the surface, by increasing circulation of the alkaline detergent solution through agitation, and/or by loosening contaminants through vibration directly. In further aspects, the sonication can be applied for at least half of the period of time for the washing, for example, the entire first period of time.

Figure 7:
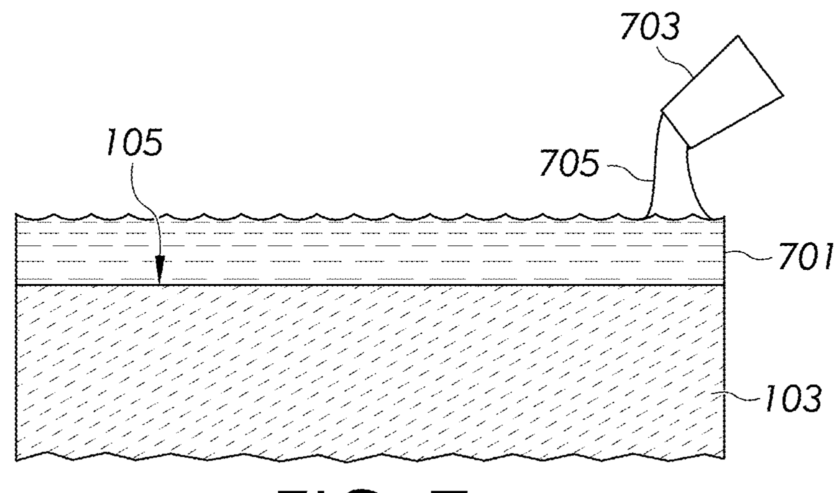
FIG. 7 schematically illustrates an example step of applying a coating in methods in accordance with aspects of the disclosure.

In aspects, after step 405, as shown in FIG. 7, methods can proceed to step 407 comprising applying a hydrophobic coating (e.g., coating 113 shown in FIG. 1) to the first major surface 105 of the substrate 103. In aspects, as shown in FIG. 1, the third major surface 115 of the coating 113 can form an exterior surface of the coated article 101, and/or the exterior surface (e.g., third major surface 115) can exhibit a water contact angle (e.g., as-formed water contact angle) within any of the corresponding ranges discussed above (e.g., about 100° or more). In aspects, as shown in FIG. 7, applying the hydrophobic coating can comprise dispensing a precursor liquid 705 from a container 703 (e.g., conduit, flexible tube, micropipette, or syringe) to form a layer 701 over the first major surface 105. In further aspects, the layer 701 can form the coating 113 without further processing (e.g., other than waiting a predetermined period of time and/or removing any excess precursor liquid). Alternatively, in further aspects, the applying can further comprise drawing an applicator bar across the first major surface 105 to achieve a layer of a predetermined thickness, for example, by controlling an amount of solvent in the composition and/or by controlling a height of the applicator bar. Alternatively, in further aspects, the applying can further comprise spin coating the first major surface 105 with the precursor liquid to achieve a layer of a predetermined thickness based on the viscosity of the composition. Alternatively, in further aspects, although not shown, depositing the composition can comprise using a roller (e.g., gravure or knife over roll coating). Additionally or alternatively, applying the coating can further comprise curing the precursor liquid to form the coating, for example, by heating the precursor liquid and/or impinging the precursor liquid with radiation (e.g., ultraviolet radiation).

In aspects, after step 407, methods can proceed to step 409 comprising assembling the coated article. In further aspects, step 409 can comprise including the coated article in an electronic device, for example, the consumer electronic device shown in FIGS. 2-3. For example, an adhesive layer can be disposed on the second major surface of the coated article, and the adhesive layer can be used to attach the coated article to a display or another part of an electronic device.

In aspects, as discussed above with reference to the flow chart in FIG. 4, methods can start at step 401 and then proceed sequentially through steps 403, 405, 407, 409, and 411. In aspects, arrow 402 can be followed from step 405 to step 411, for example, if methods are complete at the end of step 411. In aspects, arrow 404 can be followed from step 407 to step 411, for example, if methods are complete at the end of step 411 (e.g., omitting step 409 if the coated article does not require further assembly after step 407). Although not shown, it is to be understood that other methods can include step 405 and/or step 407 independent of the other steps discussed above. At the end of methods (e.g., upon reaching step 411) can comprise any one or more of the aspects discussed above for the first major surface and/or the coated article (e.g., surface roughness of the first major surface, water contact angle, abraded water contact angle, maximum compressive stress, ring-on-ring strength). Any of the above options may be combined to make a coated article in accordance with aspects of the disclosure.

EXAMPLES

Various aspects will be further clarified by the following examples. Tables 1-2 present treatment conditions and properties of the resulting first major surface of the substrate and/or coated article. Unless otherwise specified, the substrate used in the Examples is a glass-ceramic substrate (having a Composition 1 of, nominally, in mol % of: 71.5 $SiO_2$; 4.2 $Al_2O_3$; 21.8 $Li_2O$; 0.05 $Na_2O$; 0.05 $K_2O$; 1.9 $ZrO_2$; 0.4 $P_2O_5$; 0.1 $SnO_2$). The exception is Comparative Example AA, which comprised a glass-based substrate (having Composition 2 of, nominally, 70.9 $SiO_2$; 12.8 $Al_2O_3$; 1.9 $B_2O_3$; 8.2 $Li_2O$; 2.4 $Na_2O$; 2.9 ZnO; 0.8 $TiO_2$). As used in Table 1, "Baseline Polish" refers to polishing with the polishing solution supplied at 20 mL/min, a pad speed of 50 rpm, and a pressure applied by the pad of 10.3 kPa (1.5 psi). As used in Table 1, "High Friction Polish" refers to polishing with the polishing solution supplied at 5 mL/min, a pad speed of 100 rpm, and a pressure applied by the pad of 27.5 kPa (4 psi). Both the "Baseline Polish" and "High Friction Polish" removed material from the first major surface at about 0.3 μm/min. The material of the loose abrasive is provided in the column headings of Table 1 (i.e., $CeO_2$, diamond, and $SiO_2$) with a loading of about 3 wt % to achieve a density of the polishing solution of 1.05 g/cm$^3$. The $CeO_2$ had a median particle size of 1.5 μm while the diamond and $SiO_2$ had a median particle size of 50 nm. For the "pH 12" wash, the cleaning solution comprised SemiClean KG (Yokohama Oils & Fats Industry Co.). For the "pH 7" wash, the cleaning solution comprised Valtron DP154 (pH 7) (available from Valtech).

Table 1 presents the surface roughness (Rq and Ra) resulting from the combination of the polishing conditions from the row label with the loose abrasive in the column label. No coating was applied to the first major surface after the washing for the measurements reported in Table 1. For example, the "Baseline Polish" with $CeO_2$ loose abrasive followed by a pH 12 wash resulted in a surface roughness Rq of 3.3 nm and a surface roughness Ra of 2.3 nm. The cells with "-" means that the combination was not tested. As shown in Table 1, the surface roughness (Ra and Rq) with the Baseline Polish (and pH 12 wash) decreases when the $CeO_2$ loose abrasive is replaced with diamond or $SiO_2$. Also, the surface roughness (Ra and Rq) decreases from the Baseline Polish to the High Friction Polish (both with pH 12 wash). This demonstrates that the "High Friction" conditions reduce the surface roughness (Ra and Rq) relative to the "Baseline Polish" conditions. For the $SiO_2$ loose abrasive, the "High Friction Polish" (with either wash condition) produces a surface roughness (Ra and Rq) less than 2 nm, and a surface roughness (Ra) less than 1 nm. As discussed above, it is believed that the increased roughness in the "Baseline Polish" is due to differential etching of the amorphous portions of the glass-ceramic (relative to the ceramic/crystalline phase). Consequently, the "High Friction" conditions reduce the surface roughness by increasing the amount of material removed by friction (e.g., abrasion) relative to the amount removed by etching. Also, it is believed that the commercially available supply of $CeO_2$ loose abrasive has a high pH (e.g., pH 14) to prevent deposition of $CeO_2$ during polishing while the diamond and $SiO_2$ can have a more neutral pH without encountering similar issues.

TABLE 1

Surface Roughness (Ra and Rq) of Polished and Washed Surfaces

| Condition/Abrasive | $CeO_2$ | Diamond | $SiO_2$ |
|---|---|---|---|
| Baseline Polish | Rq: 3.3 nm | Rq: 2.8 nm | Rq: 2.4 nm |
| Wash: pH 12 | Ra: 2.3 nm | Ra: 2 nm | Ra: 1.6 nm |
| High Friction Polish | Rq: 2.1 nm | Rq: 2.8 nm | Rq: 1.4 nm |
| Wash: pH 12 | Ra: 1.4 nm | Ra: 1.9 nm | Ra: 0.9 nm |
| Baseline Polish | Rq: 1.5 nm | — | — |
| Wash: pH 7 | Ra: 1.1 nm | — | — |
| High Friction Polish | — | Ra: 0.67 nm | Ra: 0.7 nm |
| Wash: pH 7 | — | Ra: 0.5 nm | Ra: 0.5 nm |

Additionally, for the $CeO_2$ loose abrasive, replacing the pH 12 wash with the pH 7 wash (following the "Baseline Polish") reduces the surface roughness (Ra and Rq) by more than 50%. Again, it is believed that the more neutral wash (pH 7 as compared to pH 12) has reduced etching, which results in a more uniform (e.g., lower roughness) surface. Likewise, for the diamond and $SiO_2$ loose abrasive, replacing the pH 12 with the pH & wash (following the "High Friction Polish"), reduces the surface roughness (Ra and Rq) by 50% or more, namely a surface roughness (Ra and Rq) less than 2 nm and less than 1 nm. This demonstrates that the "High Friction Polish" conditions and the "pH 7" wash both reduce the surface roughness (Ra and Rq) relative to the "Baseline Polish" and "pH 12" wash, respectively. Further, the combination of the combination of the "High Friction Polish" conditions and the "pH 7" wash reduces the surface roughness more than either substitution on its own. Consequently, the combination of the High Friction Polish" conditions and the "pH 7" provides an unexpected benefit in the extent of reduction in surface roughness.

Table 2 presents the contact angles measured (i.e., abraded contact angles measured with deionized water at 25° C.) after the stated number of cycles in the Steel Wool Abrasion Test for Examples ("Ex") 1-5 and Comparative Examples ("CE") AA-BB. As shown, the loose abrasive for Example 1 and Comparative Example BB was $CeO_2$, the loose abrasive for Examples 2 and 4 was diamond, and the loose abrasive for Examples 3 and 5 was $SiO_2$. Examples 1-5 were polished using the "High Friction" conditions stated above while Comparative Example BB was polished using the "Baseline" conditions stated above. The wash for Examples 1-3 had a pH of 7, and the wash for Examples 4-5 and Comparative Example BB had a pH of 7. As stated above, Comparative Example AA was a glass substrate (as opposed to the glass-ceramic substrate in Examples 1-5 and Comparative Example BB) that was not subjected to any treatment prior to coating. The first major surface of Examples 1-5 and Comparative Examples AA-BB was coated with the same perfluoropolyether coating.

TABLE 2

Treatment conditions and contact angles of abraded coated articles

| Cycles | Ex. 1 | Ex. 2 | Ex. 3 | Ex. 4 | Ex. 5 | CE AA | CE BB |
|---|---|---|---|---|---|---|---|
| Abrasive | $CeO_2$ | Diamond | $SiO_2$ | Diamond | $SiO_2$ | n/a | $CeO_2$ |
| Polishing | High Friction | High Friction | High Friction | High Friction | High Friction | n/a | Baseline |
| Wash (pH) | 7 | 7 | 7 | 12 | 12 | n/a | 12 |
| 0 | 115° | 115° | 115° | 115° | 115° | 115° | 115° |
| 200 | 115° | 115° | 115° | 102° | 102° | 107° | 94° |
| 400 | 115° | 114° | 115° | 88° | 87° | 99° | 78° |
| 600 | 115° | 114° | 114° | 80° | 81° | 90° | <75° |
| 800 | 115° | 113° | 114° | 75° | 75° | <75° | <75° |
| 1800 | 115° | 110° | 114° | <75° | <75° | <75° | <75° |
| 2800 | 115° | 110° | 114° | <75° | <75° | <75° | <75° |

TABLE 2-continued

Treatment conditions and contact angles of abraded coated articles

| Cycles | Ex. 1 | Ex. 2 | Ex. 3 | Ex. 4 | Ex. 5 | CE AA | CE BB |
|---|---|---|---|---|---|---|---|
| 3800 | 115° | 108° | 113° | <75° | <75° | <75° | <75° |
| 4800 | 115° | 107° | 113° | <75° | <75° | <75° | <75° |
| 5800 | 115° | 104° | 113° | <75° | <75° | <75° | <75° |
| 6800 | 114° | 101° | 111° | <75° | <75° | <75° | <75° |
| 7800 | 114° | 101° | 111° | <75° | <75° | <75° | <75° |
| 8800 | 113° | 98° | — | <75° | <75° | <75° | <75° |

As shown in Table 2, Examples 1-3 maintained an abraded contact angle of 100° or more for at least 7,8000 cycles. Examples 1 and 3 maintained an abraded contact angle of 110° or more for at least 7,800 cycles. As noted above, Examples 1-3 used both the "High Friction" polishing and the pH 7 wash. In contrast, Examples 4-5 used the 12 pH wash (instead of the pH 7 wash following the "High Friction" polishing), and the abraded contact angle fell below 100° by 600 cycles (and below 80° by 800 cycles). This demonstrates the unexpected benefit of the more neutral (less than a pH of 11) wash.

Comparative Example AA performed similarly to Example 5 (with the abraded contact angle falling below 100° by 400 cycles and below 80° by 800 cycles). Again, this demonstrates the superior and unexpected performance of the treatment of Examples 1-3 (including the "High Friction Polish" and the more neutral (e.g., pH 7) wash). Comparative Example BB performed worse than any of Examples 1-5 with the abraded contact angle of Comparative Example BB falling below 100° by 200 cycles and below 80° by 400 cycles). This demonstrates the improved abrasion resistances from (1) replacing the $CeO_2$ loose abrasive with one of the loose abrasive mentioned above (e.g., diamond, $SiO_2$) and (2) replacing the "Baseline" polishing conditions with the "High Friction" polishing conditions.

The above observations can be combined to coated articles with good adhesion and good abrasion resistance (e.g., an abraded water contact angle of about 100° or more after 2,000 cycles or more, after 4,000 cycles or more, about 6,000 cycles or more, or about 8,000 cycles or more in a Steel Wool Abrasion Test), for example, maintaining a hydrophobic and/or oleophilic character. Also, providing the coating on a substrate increases a durability of the coated article, for example, by filling and/or protecting surface flaws in the substrate from damage. Additionally, the substrate may comprise a glass-based substrate and/or a ceramic-based substrate such as a glass-ceramic to enhance a puncture resistance and/or an impact resistance. Further, the glass-based substrate and/or ceramic-based substrate may be chemically strengthened to further enhance the impact resistance and/or the puncture resistance of the coated article while simultaneously facilitating good bending performance. Providing a surface roughness Ra and/or surface roughness Rq of about 1.6 nm or less or about 1.5 nm or less can enable good adhesion between the substrate and the hydrophobic coating and/or a good abrasion resistance of the hydrophobic coating. Especially when the substrate is a glass-ceramic substrate, methods of the present disclosure can achieve the above-mentioned surface roughness Ra and/or surface roughness Rq while other methods may not.

Also, the above observations can be combined to provide methods of polishing, washing, and making coated articles that can achieve coated articles with good adhesion and good abrasion resistance (e.g., between a coating and a substrate). Especially for glass-ceramics, etching during the polishing can increase a surface roughness of the first major surface and/or introduce irregularities that can be the origin of cracks and/or mechanical failure. Consequently, methods provided herein increase a fraction of material removed by friction (e.g., abrasion, as opposed to etching) while reducing a fraction of material removed by etching (e.g., chemical dissolution of a material of the substrate). Providing a loose abrasive comprising silica, zirconia, and/or alumina may be less chemically reactive than other materials (e.g., ceria), which can reduce a portion of the material being removed by etching as opposed to abrasion during the polishing. Providing a slightly alkaline solution (e.g., pH from 7 to 11 or from 9 to 10.5) can reduce an amount of a material removed by etching as opposed to abrasion during the polishing. Providing a relatively low rate of polishing liquid (e.g., about 20 millLiters per minute (mL/min) or less, from about 1 mL/min to about 10 mL/min, or from about 2 mL/min to about 5 mL/min) can increase a fraction of material removed by friction. Providing a rotation rate of a pad during the polishing of about 95 rpm or more (e.g., from about 100 rpm to about 145 rpm) can increase an amount of material removed by abrasion (e.g., by increasing a volume swept out by the loose abrasive per period of time) during the polishing while maintaining thermal and quality control during the polishing. Providing a pressure of about 25 kPa or 27.5 kPa or more can increase an amount of material removed by abrasion (e.g., by increasing a frictional force between the loose abrasive and the first major surface) during the polishing while maintaining thermal and quality control during the polishing.

Providing a slightly alkaline solution (e.g., pH from 7 to 11 or from 9 to 10.5) can reduce an amount of a material removed by etching during the washing. As demonstrated by the Examples herein, providing a cleaning liquid (for the washing) with a slightly alkaline pH (e.g., pH from 7 to 11 or from 9 to 10.5) can significantly increase an abrasion resistance of the resulting coated article. For ceramic-based substrates and/or glass-ceramics, etching during the washing can increase a surface roughness of the first major surface and/or introduce irregularities that can be the origin of cracks and/or mechanical failure. Providing a fluorinated solvent can facilitate removal of waxes and/or other hydrocarbons that may have been transferred to the first major surface during the polishing and/or previous processing. Additionally, any fluorine-containing residue remaining after the washing can reduce an amount of moisture that is transferred to and/or absorbed by the first major surface between the washing and subsequent coatings (e.g., with a hydrophobic coating), where the moisture could otherwise impair an adhesion of the subsequent coating to the substrate. Additionally, methods exist to recycle fluorinated solvents, which can reduce cost and environmental impact of the washing.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A method of polishing a first major surface of a substrate comprising:

polishing the first major surface with a polishing liquid; and then washing the first major surface with a cleaning liquid, wherein the cleaning liquid comprises a pH in a range from about 7 to about 11, and wherein the substrate comprises a first compressive stress region extending to a first depth of compression from the first major surface, and a first maximum compressive stress of the first compressive stress region is about 300 MegaPascals or more.

2. A method of forming a coated article from a substrate comprising a first major surface, the method comprising:

polishing the first major surface with a polishing liquid; and then washing the first major surface with a cleaning liquid, wherein the cleaning liquid comprises a pH in a range from about 7 to about 11; and then applying a hydrophobic coating to the first major surface to form an exterior surface of the coated article, wherein the exterior surface exhibits an as-formed water contact angle of about 100° or more, and the coated article exhibits an abraded water contact angle of about 100° or more after being abraded with steel wool for 8000 cycles in a Taber Test.

3. The method of claim 2, wherein the coated article exhibits a ring-on-ring strength of about 150 kgf or more.

* * * * *